Sept. 8, 1925.

C. W. SIDDLE 1,553,193

VARIABLE SPEED MECHANISM

Filed Dec. 5, 1923

C. W. SIDDLE 1,553,193

VARIABLE SPEED MECHANISM

Filed Dec. 5, 1923

Inventor
Charles W. Siddle
by Hubert W. Jenner
Attorney

Patented Sept. 8, 1925.

1,553,193

UNITED STATES PATENT OFFICE.

CHARLES WILLIAM SIDDLE, OF HUDDERSFIELD, ENGLAND.

VARIABLE-SPEED MECHANISM.

Application filed December 5, 1923. Serial No. 678,613.

*To all whom it may concern:*

Be it known that I, CHARLES WILLIAM SIDDLE, a subject of King George V of Great Britain, residing at Huddersfield, in the county of York, England, have invented a new and useful Improvement in Variable-Speed Mechanism, of which the following is a specification.

The invention relates to variable speed mechanism, as employed for instance on motor vehicles or on lathes or other tools or apparatus, for enabling different speed ratios to be obtained between a driving member and a driven member.

The invention has for its object to provide improved mechanism whereby the speed of a driven member can be varied, either automatically or by arbitrary control, in any proportion ranging from the speed of the driving member down to zero, or in some cases if a greater range be called for, from a speed determinedly higher than that of the driving member, down to zero.

According to the invention a series of one-way rotary clutches, disposed circumferentially about the axis of the driven member, are provided with pinions which mesh with a common central gear wheel rotatively connected with the driven member. Crank arms, fast on the operating spindles of the clutches, are adapted, by oscillating movement given to them from the driving member, to give rotary movement in one direction to the clutches, which rotary movement is transmitted to the central gear wheel and thus to the driven member. It follows that the extent of the oscillations given to the crank arms determines the rotary motion transmitted to the driven member, and an important feature of the invention resides in the means employed to vary such oscillations. The characteristic feature of these means is that the oscillations are produced by a transmitting member whose path of rotation relative to the axis of the driving member is variable by rotation of said transmitting member, or a part carrying same, about an axis offset from that of the driving member, the arrangement being such that in one extreme position of the transmitting member oscillations of maximum extent are produced whilst in the other extreme position of the transmitting member its centre coincides with the axis of the driven member and no oscillations are produced. In the preferred embodiment of the invention, the driving member has fast with it an eccentric surrounding which is a movable eccentric. The latter is caused to act upon cam members carried by or on, or forming, the crank arms of the clutch actuating spindles and according to the position of the movable eccentric in relation to the fixed eccentric a greater or less amount of oscillation is given to the clutches. In one extreme position of the movable eccentric a maximum oscillation is given, and by rotating the movable eccentric the amount of oscillation imparted to the clutches is gradually reduced until the other extreme position of the movable eccentric is reached. In this latter position the centre of the movable eccentric coincides with the axis of the driving member, so that no oscillation is imparted to the clutches and the driven member remains at rest. The rotation of the movable eccentric may be effected by suitable control means, or it may be effected automatically by the retarding effect, exerted by an increasing load on the driven member, upon the movable eccentric against the action of a spring tending to constantly rotate the latter to its position of maximum throw, but preferably the control means are of such construction as to operate automatically as just described and yet to permit of arbitrary rotation of the movable eccentric when so desired.

As an alternative to the employment of the fixed and movable eccentrics, a similar result may be attained by providing the driving member with an eccentrically disposed recess to receive loosely the end of a spindle whose opposite end is suitably cranked or provided with a pin suitably offset from its centre; such pin being connected by a series of connectors to, or carrying a bowl or runner adapted to act upon the crank arms of the respective one-way clutches. If the spindle referred to be supported in a bore formed eccentrically in a boss, mounted to rotate in axial alignment with the driving member, and be rotated in said bore by automatic or arbitrary control means, in the same manner as the movable eccentric in the embodiment first described, the position of the crank pin centre in relation to the axis of the driving member can be varied, from the extreme position of the crank pin in which a maximum oscillation is given to the one-way clutches and, consequently, a maximum speed is transmitted to the driven member, to the zero position in which the crank pin centre coincides with the driving axis and no oscillating movement is given to the clutches.

Such being briefly the nature of the invention, a fuller description will be given with the aid of the accompanying drawings, in which.

Figure 1:
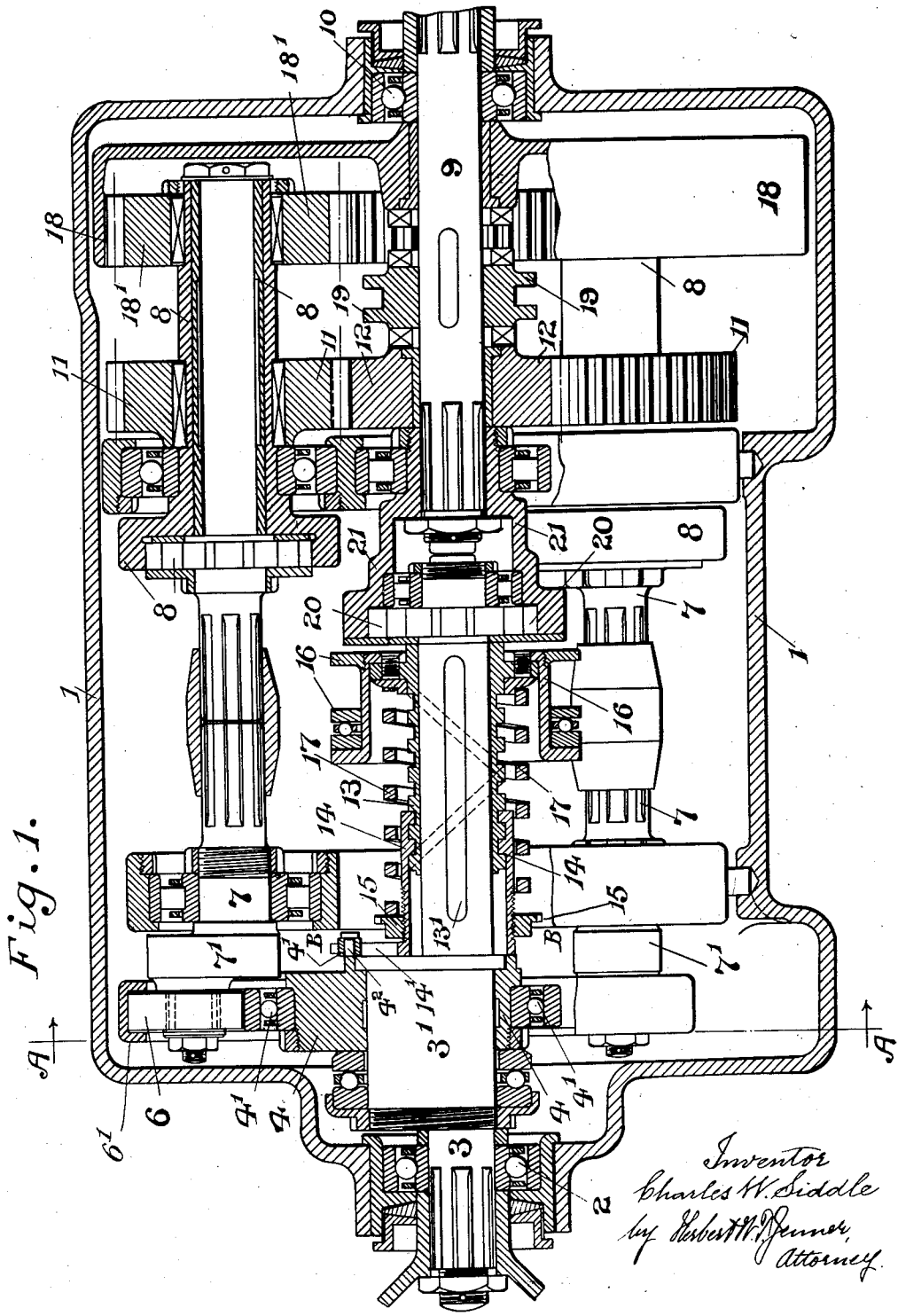
Fig. 1 is a longitudinal section, on the central plane, of a variable speed mechanism constructed according to and embodying the invention in its preferred form.
Figure 2:
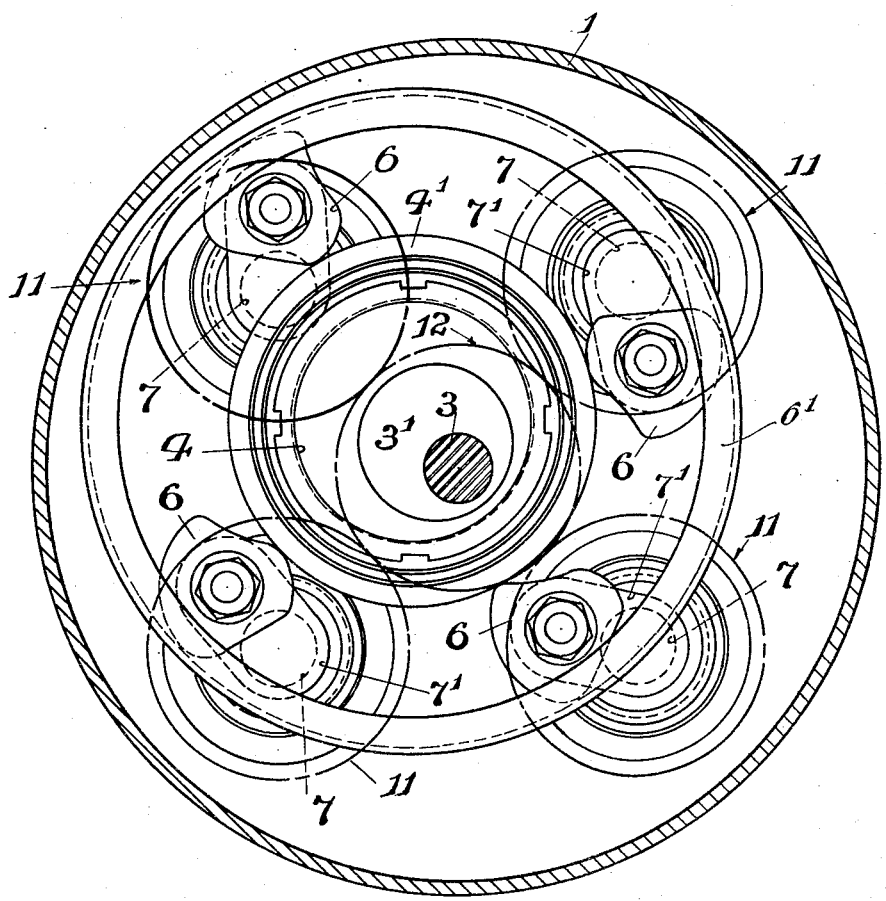
Fig. 2 is a transverse section on the line A—A of Fig. 1.
Figure 3:
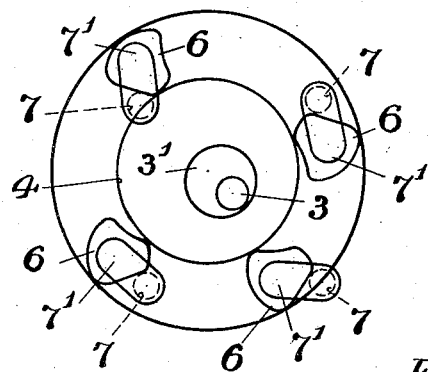
Figure 4:
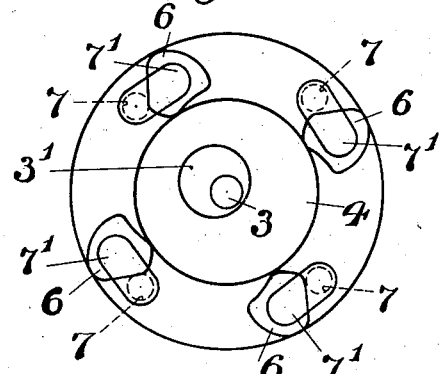
Figure 5:
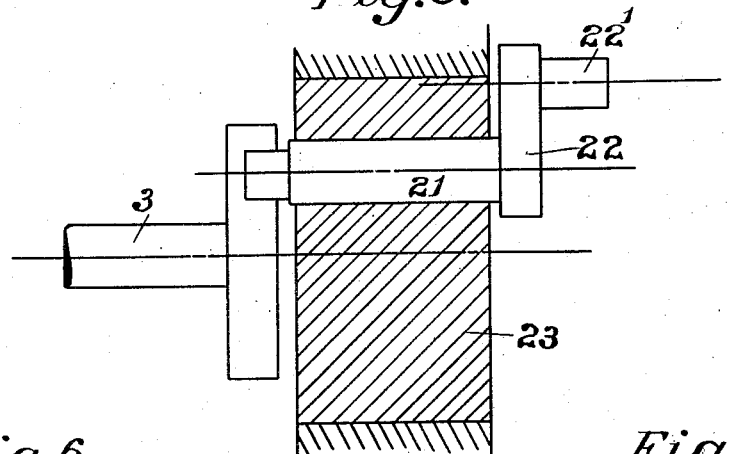
Figure 6:
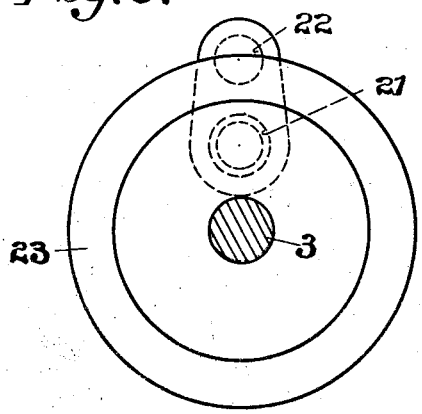
Figure 7:
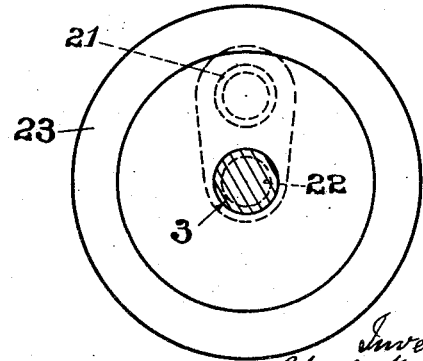

Figs. 3 and 4 are two diagrams illustrating the two extreme positions of the gear shown in Figs. 1 and 2; and Figs. 5, 6 and 7 are diagrams illustrating the alternative arrangement mentioned in which a cranked spindle supported in offset relation to the driving axis is substituted for a fixed and movable eccentric.

Figure 8:
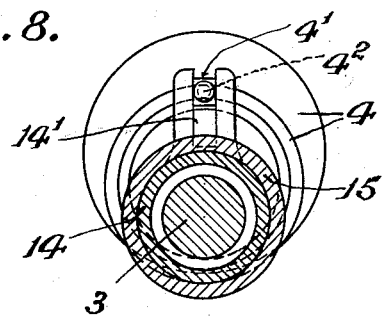

Fig. 8 is a detail section on the line B—B, Fig. 1.

Referring to the drawings, the illustrated embodiment of the invention comprises a casing 1 having supported in a bearing 2 at one end a driving member 3. Fast with the driving member, and in the instance shown integral with it, is an eccentric boss 3' on which is mounted a movable eccentric 4. The latter, through a suitable antifriction bearing 4', acts upon a series of cam members 6 fast with a series of crank arms 7' formed on the actuating spindles 7 of a series of one-way clutches 8 of suitable known construction. In the instance shown, four sets of clutches are provided, but it will be understood that this number may be varied. The clutches are disposed circumferentially about the axis of a driven member 9 supported in a suitable bearing 10 at the opposite end of the casing to the driving member 3. The driven portions or outer members of the clutches 8 carry pinions 11 which mesh with a common central gear 12 adapted to be rotatively connected with the driven member 9.

As the spindles 7 are rocked in one direction, the outer members of the clutches 8 are driven through arcs dependent upon the extent of the rocking movement, and the motion is transmitted to the central gear wheel 12, and as the clutches operate in regular succession the central gear is driven.

In the position illustrated the movable eccentric 4 is shown in its extreme or maximum throw position in relation to the fixed eccentric 3'. As the driving member rotates, therefore, the eccentric 4 imparts a maximum rocking motion to the spindles 7 and a maximum speed is transmitted to the driven member. If, however, the eccentric 4 be rotated about the eccentric 3' the amount of rocking movement given to the spindles 7, and the rotary speed imparted to the driven member, will gradually be less and less as the centre of the eccentric 4 approaches the axis of the driving member until finally, when the centre of the eccentric coincides with the driving axis a zero position is reached and the central gear is no longer rotated. The two extreme positions of the eccentric 4 are shown diagrammatically in Figs. 3 and 4 Fig. 3 showing it in its maximum speed position and Fig. 4 showing it in the zero position.

The cam members 6 are appropriately shaped to remain in operative contact with the eccentric 4 during a relatively long arc of movement of the latter, so that little or no loss of motion occurs and the speed of the driven member approximates or coincides with that of the driving member. A loose floating ring 6' channel-shaped in cross-section, straddles the cams 6 and is wholly supported by them. This floating ring holds the cams in contact with the eccentric so that no springs are required to return the crank arms after each actuation.

A sleeve 13 slidably mounted on a key 13' on the driving member has its outer surface formed as a screw thread and upon it works a nut member 14 operatively connected with the eccentric 4 by a slotted part 14' in which engages a block 4' carried by a pin 4² fast with the eccentric 4. A screwed portion of the outer surface of the member 14 receives an internally screwed ring 15 and between this ring and an annularly grooved boss 16 fast to the sleeve 13 there is confined a spiral spring 17 which, by its pressure against the member 14, tends to rotate the nut 14 and consequently the eccentric 4 towards its position of maximum throw.

If, in the running of the gear, the load upon the driven member increases, a retarding effect is exerted upon the eccentric 4 with the result that it is rotated backwardly on the eccentric 3', causing the spring 17 to become compressed. The backward rotation of the eccentric 4 causes a reduced speed to be transmitted to the driven member in proportion to the increase in the load, and on a decrease in the load the spring acts to rotate the eccentric 4 towards or to its maximum throw position. Rotation of the eccentric 4 may be effected arbitrarily by endwise movement of the sleeve 13 which may be given by a forked member engaging in the groove of the boss 16 and having a connection extending through the casing to suitable control means. Endwise movement of sleeve 13 causes rotation of the nut member 14 and, consequently, of the eccentric 4.

If it be desired to provide for reversal of the direction of motion of the driven member this may be effected conveniently by mounting the central gear wheel 12 loosely upon the driven member and mounting adjacent to it, also loosely, an internally toothed gear 18 meshing with pinions such as 18' fast on the driven members of the clutches 8. The opposing faces of the gears 12 and 18 are provided with clutch surfaces adapted to be engaged by corresponding surfaces on a clutch member 19 slidably mounted on a key on the driven member. Accordingly as the clutch member 19 be clutched to one or other of the gears 12 or 18 a forward or a reverse drive will be imparted to the driven member. The means just described for enabling a reverse drive to be imparted to the driven member are only given by way of illustration and other alternative ways will readily suggest themselves to those skilled in the art.

Since the driving and driven members are in axial alignment, the driving member 3 may conveniently carry one portion 20 of a free wheel clutch of suitable known construction and the other portion 20' of the clutch be carried by the driven member 9, the arrangement being such that the driving member can overrun the driven member but if the latter attempts to overrun the driving member the clutch will operate to cause the driving member to be driven. This arrangement will be of service if the gear is employed on a motor vehicle, since by its means the engine of the vehicle can be run against compression and be caused to act as a brake.

I will now refer to the alternative arrangement which, as above mentioned, may be substituted for the movable eccentric 4 and fixed eccentric 3', and which is illustrated diagrammatically at Figs. 5, 6 and 7.

According to this arrangement a spindle 21 is loosely mounted at one end in a recess offset from the centre of the driving member, and has its opposite end provided with a crank 22 having a crank pin or transmitting member 22' offset from its centre. The spindle is supported in an eccentric bore in a boss 23 rotatable in axial alignment with the driving member. It follows that as the driving member rotates, a throw will be given to the crank pin 22 of which the extent will be determined by the position of such pin in relation to the axis of the driving member. Fig. 5 shows the position of maximum throw and it will be understood that if the spindle 21 be rotated relatively to the driving member the throw of the pin 22 will be reduced gradually as its centre approaches the axis of the driving member until finally a zero position is reached as shown in Fig. 7, just as in the arrangement first described.

Obviously instead of providing a crank 22 and crank pin 22', the spindle 21 may carry a fixed eccentric.

In this instance rotation of the spindle about its axis, to vary the position of the axis of the transmitted member relative to that of the driving member, is effected as before against the action of a spring tending to rotate the spindle to that position in which the transmitting member has its maximum throw and means are similarly provided whereby the spindle can be rotated arbitrarily when desired. In this latter arrangement, the distance by which the axis about which the transmitting member is rotatable to effect variation of throw, is shown as being equal in length to the distance between such axis and the axis of the transmitting member thus necessitating one half of a revolution to carry the transmitting member from the zero to the maximum throw position, or vice versa. It will be understood that by suitably proportioning the parts, the arc of rotation necessary may be reduced if desired. For constructional reasons the arrangement first herein described is preferred.

I have described good practical means whereby my invention may be carried into practice, but I do not wish to limit myself to the particular construction and arrangement of the parts employed, otherwise than as set forth in the appended claims.

Having thus described my invention, what I claim as new and desire to secure by Letters Patent is:—

1. In a variable speed mechanism, a rotary driving member, a driven member, intermediate driving devices operatively connecting the said members, means for varying the transmitted speed of the said driven member by arbitrary control, and means for varying the transmitted speed of the said driven member automatically in proportion to its load and to an extent below that of the maximum speed imposed on the driven member by the said arbitrary control means, comprising a variable throw eccentric rotated by the said driving member, a rotary screwthreaded sleeve splined to slide on the said driving member, and a spring-pressed nut engaging with the said sleeve and operatively connected with the said eccentric.

2. In a variable speed mechanism, a rotary driving member, a variable throw eccentric rotated by the said driving member, intermediate driving devices operatively connecting the said members, a rotary screw threaded sleeve splined to slide on the said driving member, a nut engaging with the said sleeve and operatively connected with the said eccentric to vary its throw, and a spring interposed between the said sleeve and nut and operating to rotate the nut in a direction to move the eccentric towards its position of maximum throw, the said nut being rotated automatically by the said eccentric when the load on the driven member is increased.

3. A variable speed mechanism as set forth in claim 2, and provided also with means for sliding the said sleeve manually to vary the speed of the driven member arbitrarily.

4. A variable speed mechanism as set forth in claim 2, and provided also with a free wheel clutch having its members carried by the driving and driven members respectively, said clutch operating to permit the speed of the driving member to overrun that of the driven member, and to cause the driving member to be driven by the driven member when the latter tends to overrun the driving member.

5. In a variable speed mechanism, a rotary driving member provided with an eccentric, a series of rock-shafts arranged around the eccentric and provided with cranks having crankpins, cams carried by the said crankpins, a floating ring channel-shaped in cross-section and arranged to straddle the said cams, said floating ring being wholly supported by the said cams and retaining them in engagement with the said eccentric, a driven member, and intermediate driving devices provided with one-way clutches and operatively connecting the said rock-shafts with the driven member.

In testimony whereof I affix my signature.

CHARLES WILLIAM SIDDLE.